(12) United States Patent
DeLuca et al.

(10) Patent No.: US 11,588,625 B2
(45) Date of Patent: *Feb. 21, 2023

(54) TRANSIENT MANAGEMENT OF DATA ENCRYPTION AND AUTHENTICATION

(71) Applicant: International Business Machines Corporation, Armonk, NY (US)

(72) Inventors: Chad DeLuca, Morgan Hill, CA (US); Daniel Gruhl, San Jose, CA (US); Linda Kato, San Jose, CA (US); Cartic Ramakrishnan, San Jose, CA (US); Chris Kau, Mountain View, CA (US); Alfredo Alba, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 64 days.

This patent is subject to a terminal disclaimer.

(21) Appl. No.: 17/211,237

(22) Filed: Mar. 24, 2021

(65) Prior Publication Data

US 2021/0211277 A1 Jul. 8, 2021

Related U.S. Application Data

(63) Continuation of application No. 16/136,360, filed on Sep. 20, 2018, now Pat. No. 11,044,078.

(51) Int. Cl.
*H04L 9/08* (2006.01)
*H04L 9/14* (2006.01)
(Continued)

(52) U.S. Cl.
CPC .......... *H04L 9/0819* (2013.01); *G06F 21/602* (2013.01); *H04L 9/14* (2013.01); *H04L 9/321* (2013.01)

(58) Field of Classification Search
CPC .......... H04L 9/0819; H04L 9/14; H04L 9/321; G06F 21/602
See application file for complete search history.

(56) References Cited

U.S. PATENT DOCUMENTS 7,526,800 B2 4/2009 Wright et al.
7,607,174 B1 10/2009 Kashchenko et al.
(Continued)

OTHER PUBLICATIONS

Michalakis, N., Location-aware access control for pervasive computing environments. Diss. Massachusetts Institute of Technology, 2003.
(Continued)

*Primary Examiner* — Ayoub Alata
(74) *Attorney, Agent, or Firm* — Lieberman & Brandsdorfer, LLC

(57) ABSTRACT

Embodiments relate to a system, program product, and method for use with a physical computing device to process a data access request. The requested data is encrypted with two keys, including a physical device authentication key and a transient key. Access to the data requires authentication on both the device level and situational level. Device situational data is monitored, which includes selectively enabling access to the requested data and de-activation of the transient key in response to a change in the monitored situational data. The transient key de-activation removes access to the requested data.

20 Claims, 8 Drawing Sheets

(51) Int. Cl.
    *H04L 9/32*     (2006.01)
    *G06F 21/60*     (2013.01)

(56) References Cited

U.S. PATENT DOCUMENTS

| | | |
|---|---|---|
| 7,848,765 B2 | 12/2010 | Phillips et al. |
| 8,996,030 B2 | 3/2015 | Grainger et al. |
| 2004/0154022 A1 | 8/2004 | Boss et al. |
| 2004/0268265 A1 | 12/2004 | Berger |
| 2005/0164675 A1 | 7/2005 | Tuulos et al. |
| 2006/0224742 A1 | 10/2006 | Shahbazi |
| 2007/0087761 A1 | 4/2007 | Anjum et al. |
| 2007/0105533 A1 | 5/2007 | Chiu et al. |
| 2007/0206799 A1* | 9/2007 | Wingert ............... H04L 9/0825 348/E7.071 |
| 2007/0219708 A1 | 9/2007 | Brasche et al. |
| 2008/0219453 A1* | 9/2008 | Chang ............... H04L 9/0897 380/44 |
| 2008/0301580 A1 | 12/2008 | Hjelmeland et al. |
| 2010/0016022 A1 | 1/2010 | Liu et al. |
| 2012/0115512 A1 | 5/2012 | Grainger et al. |
| 2012/0117384 A1* | 5/2012 | Hirsch ............... G06F 21/62 713/167 |
| 2014/0317398 A1* | 10/2014 | Betz ............... H04L 63/062 713/155 |

OTHER PUBLICATIONS

List of IBM Patents or Applications Treated as Related, Mar. 2021.

\* cited by examiner

TRANSIENT MANAGEMENT OF DATA ENCRYPTION AND AUTHENTICATION

CROSS REFERENCE TO RELATED APPLICATION(S)

This application is a continuation patent application claiming the benefit of the filing date of U.S. patent application Ser. No. 16/136,360 filed on Sep. 20, 2018 and titled "Transient Management of Data Encryption and Authentication", now U.S. Pat. No. 11,044,078, the entire contents of which are hereby incorporated by reference.

BACKGROUND

The present embodiments relate to management and delivery of encrypted data to a destination device. More specifically, the embodiments relates to a platform to incorporate bi-level authentication and decryption of the encrypted data, including employment of a transient situational authentication key.

Use of computing devices has evolved from desktops to laptops, and now to tablets and mobile telephones. It has become commonplace for tablets and mobile telephones to be transported across platforms, such as between work and home. With this transportation, it has become common for employees to transport and use their own mobile telephones and tables into the workplace, thereby creating new security and management challenges for information technology. Such challenges include, but are not limited to, theft of such devices, securing corporate data on personal devices, preventing unauthorized access to data from the personal devices. One lost device could put sensitive or private data into the wrong hands. Accordingly, there is a need for a solution for mobile device management that includes security and application management.

SUMMARY

The embodiments include a system, computer program product, and method for facilitating notification processing and delivery.

In one aspect, a system is provided with a computer platform for managing bi-lateral authentication of encrypted data, including persistent and transient authentication. A physical computing device is configured with hardware to support a data access request, with the data encrypted with a physical device authentication key and a transient key. The transient key is subject to physical device situational data, such that validity of the transient key is related to a change in the situational data. Tools are provided in communication with the computing device to support authentication of the encrypted keys. The tools include, but are not limited to, an authentication manager and a monitor. The authentication manager functions to validate a physical device key and a transient key based on physical device transient data. The monitor functions to manage device situational data. The monitor selectively enables access to the requested data in response to validation of both keys, e.g. physical device authentication and transient keys. The authentication manager is configured to de-activate the transient key in response to a change in the monitored situational data. The de-activation of the transient key removes access to the requested data.

In another aspect, a computer program device is provided with program code to support situational data authentication. The program code is executable by a processing unit to process a data access request, with the data encrypted with a physical device authentication key and a transient key. The transient key is subject to physical device situational data, such that validity of the transient key is related to a change in the situational data. Program code is provided to validate both the physical device authentication key and the transient key. Program code is also provided to selectively enable access to the requested data in response to validation of the keys. The transient key is subject to selective de-activation in response to a change in the monitored situational data. The key de-activation of the transient key removes access to the requested data.

In yet another aspect, a method is provided for use by a computer platform for supporting situational data authentication. The method processes a data access request, with the data encrypted with a physical device authentication key and a transient key. The transient key is subject to physical device situational data, such that validity of the transient key is related to a change in the situational data. Device situational data is subject to monitoring to facilitate and enable selective access to the requested data. Access to the requested data is selectively enabled responsive to validation of the keys. The transient key is subject to selective de-activation in response to a change in the monitored situational data. The transient key de-activation removes access to the requested data.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

Figure 1:
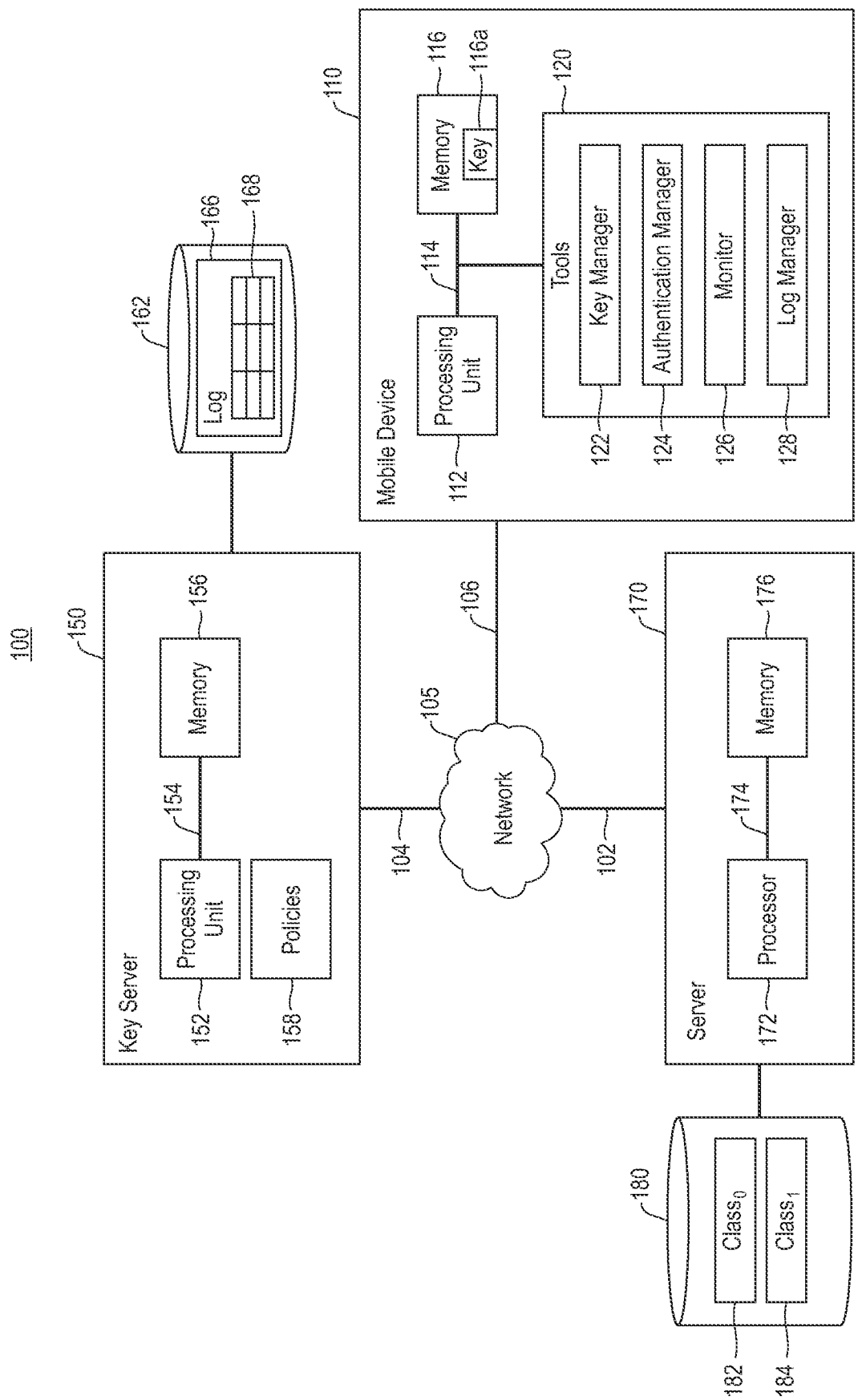
FIG. 1 depicts a system diagram illustrating a computer system and associated components for processing and facilitating authentication of encrypted situational data.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Techniques described herein are directed to delivering encrypted data through an electronic medium to an intended recipient, and more specifically to a destination device associated with or assigned to the intended recipient. It is understood that data may be communicated between stationary devices, and in one embodiment non-stationary devices. At the same time, the need to properly encrypt and decrypt data is understood. Encryption techniques are also understood in the art. However, there is a need to leverage encryption and authentication techniques to characteristics associated with non-stationary devices, including device situational data. As the location or associated roles of the device may be subject to change, authentication and decryption of encrypted data is also subject to change. More specifically, situational and role related data are referred to herein as transient data and are subject to change based on the location and position of the associated device as well as roles and responsibilities of an account holder of the associated device. By accounting for the transient data, restrictions on the data are maintained in a dynamic manner and in real-time.

It is understood and recognized that the roles and responsibilities within an organization are also dynamic and subject to change. The dynamic nature of roles and responsibilities may be on a periodic basis, such as time of day, week, month, quarter, etc. For example, in one embodiment, an employee may have a first class of responsibilities and associated data access at a first select set of hours of the day, and a second class of responsibilities and associated data access at a second select set of hours of the day. In one embodiment, an employee may be assigned to the first class during on duty hours and access to the second class during non-duty hour. In one embodiment, an employee may be assigned to the first class based on the physical location of their accessing device. Regardless of the roles and responsibility data access limitation, an authentication of the device and requested access is required prior to viewing and/or utilizing the data. Accordingly, situational authentication is dynamic based on a variety of factors.

Referring to FIG. 1, a schematic diagram of a computer system and associated components (100) for processing and facilitating authentication of encrypted situational data is depicted. As shown, a mobile computing device (110) is provided in communication with a server (170) and a key system (150), shown herein as a key server, across a network (105) and associated network connections (102), (104), and (106), respectively. The server (170) is configured with a processing unit (172), also referred to herein as a processor, in communication with memory (176) across a bus (174).

The server (170) is shown operatively coupled to data storage (180). Although shown locally coupled to the server (170), in one embodiment, the data storage (180) may be operatively coupled to the server (170) across the network (105). As shown, two classes of data are maintained in the data storage, including a first class of data, $class_0$, (182) and a second class of data, $class_1$, (184). In one embodiment, the first class of data (182) is referred to as encrypted data and the second class of data (184) is referred to as non-encrypted data, although the assignment of data and data classes should not be considered limiting. As requests for data are received from the mobile computing device (110), data managed by the server (170) is selectively transmitted to the device (110). Accordingly, the server (170) and associated data storage (180) function to serve data to the requesting mobile computing device (110).

As shown, the mobile computing device (110) is configured with a processing unit (112) in communication with memory (116) across a bus (114). Tools (120) are provided local to the computing device (110) to support data request, device authentication, and data decryption. The tools include, but are not limited to, a key manager (122), authentication manager (124), a monitor (126) and a log manager (128). The tools (120) are operatively coupled to the processing unit (112) and memory (116). Data requested from the server (170) is streamed to the device (110) across a network connection. Streamed data is divided into data chunks, referred to herein as first and second data chunks. Details of the data chunks are shown and described in FIG. 2. Each of the data chunks are separately encrypted with key pairs. Receipt of the data stream is initially processed by the key manager (122), which selectively receives first and second key pairs of the first and second data chunks, respectively. The processing includes, but is not limited to, device authentication and situational authentication.

The authentication manager (124) is responsible for data authentication. Each key pair includes a device authentication key and a transient key. See FIG. 2 for details of the encrypted data and the associated key pair(s). The authentication manager (124) functions to validate both keys, with the transient key being directed to situational data, such as the situation directed at the physical computing device (110). It is understood that transient data, e.g. situational data, is dynamic and subject to change. The monitor (126) functions to assess the situation of the device (110) in real-time. It is understood that the authentication manager (124) either authenticates the received data chunks or does not authenticate the received data chunks. The authentication and associated authentication tools utilize a bifurcated process, with one aspect of the authentication being directed at the physical device (110) and another aspect being directed at the situation of the device or device holder. Access to the request data is subject to the bifurcated authentication. The authentication manager (124) assesses and oversees both aspects of the authentication. With respect to the situational aspect, the authentication manager (124) monitors situational data and removes the transient key from the physical device (110) based on a change in the situational data. This removal of the transient key also removes access to the requested data. Accordingly, without access to the authentication element of the transient key, the authentication of the encrypted data stream and associated data chunk(s) fails.

It is understood that situational data is dynamic. The device (110) in $location_A$ requires transient $key_A$, and the device in $location_B$ requires transient $key_B$, etc. It is also understood that patterns may be detected, and transient keys may be activated or deactivated responsive to the pattern or associated device behavior. In one embodiment, this activation and de-activation may be a replacement or supplementation of the transient key removal. For example, the computing device (110) may be assigned to an employee who follows a schedule, and the activation and de-activation of the transient key may be responsive to the schedule and adherence to the schedule. The transient key may be referred to as a multi-state key including at least two different states, with these states directed at activation or de-activation of the transient key, respectively. Each of these states are directed to the activate nature of the transient key, including invalidation of the transient key, de-activation of the transient key, and removal of the transient key from the device (110). Accordingly, the state change of the transient key is directly related to situational device data.

As shown herein, the key server (150) is configured with a processing unit (152) operatively coupled to memory (156) across a bus (154). A log (166) of key pairs is operatively coupled to the computing device (110) via the key server (150). In one embodiment, the log (166) is local to the key system (150). For example, the log (166) may be retained on data storage (162) or memory (156) local to the key server (150). Similarly, in one embodiment, the log (166) is operatively coupled to the computing device (110) across the network (105). The log (166) is shown herein with a ledger (168) that retains an account of key pairs, shown herein as entry$_0$, entry$_1$, . . . entry$_N$. In one embodiment, the individual entries identify the requesting device, the date and time of the request, and whether or not the request was validated. The data retained in the ledger (168) enables the log (166) to function as an audit platform for the authentication manager (124). Specifically, the authentication manager (124), or in one embodiment an audit tool, may access the log (166) to identify all key pair issuances and validations in order to assess security of any validated and decrypted data. Accordingly, the log (166) functions as a platform for audit of the associated data and/or computing device.

In addition to the log (166) a set of policies or rules (158) may be operatively coupled to the computing device (110). As shown herein, the policies (158) are local to the key system (150), although this embodiment should not be considered limiting. The policies (158) are a set of ancillary rules that function relative to the authentication elements shown herein. In one embodiment, the policies (158) function as an over-ride for data access and authentication. Application of one or more policies may be based on the device and/or situational data, with the application being recorded as an entry in the log (166). For example, if the policy is an over-ride, the requestor of the data may be granted limited access to the data, such as limiting the quantity of accesses, or class of data available for access. In one embodiment, the over-ride provides a limited aspect to the decryption, such as limiting the decryption to one or more select or identified data chunks. Since the over-ride functions as an exception to access otherwise encrypted data, the log manager (128) creates a recording of the authentication override in the log (166). In addition, the log manager (128) activates an audit protocol of the log to ensure that the exception to the data access is audited.

Figure 2:
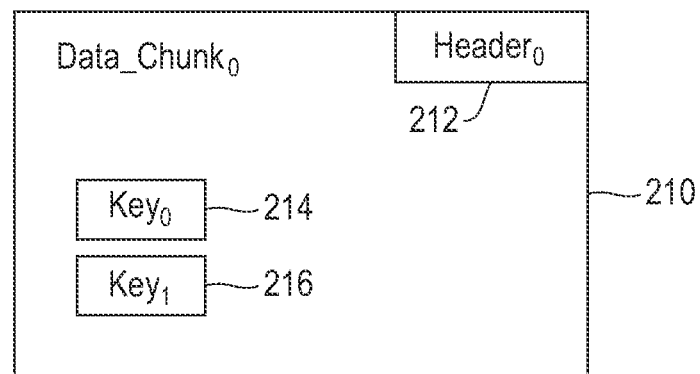
FIG. 2 depicts a block diagram illustrating the data stream and associated data chunks therein.
Figure 2:
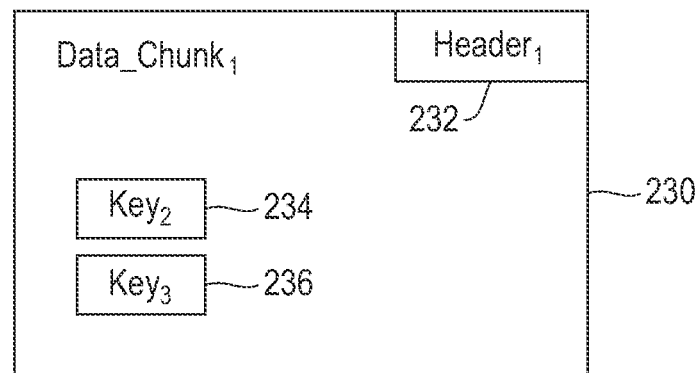
Figure 2:
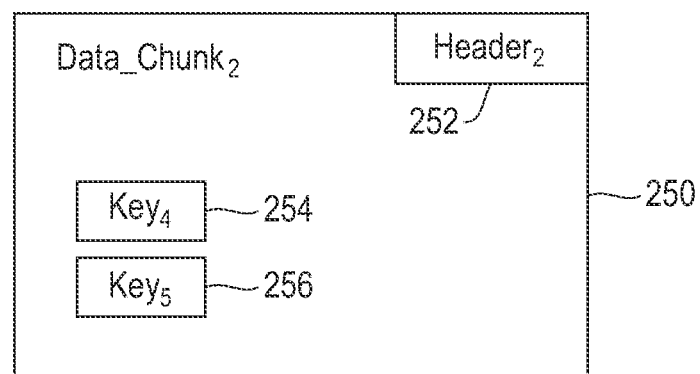

Referring to FIG. 2, a block diagram (200) is provided to illustrate the data stream and associated data chunks therein. As shown herein, the data stream is comprised of a plurality of data chunks, including data_chunk$_0$ (210), data_chunk$_1$ (230), and data_chunk$_2$ (250). Although only three data chunks are shown, this quantity is for illustrative purposes and should not be considered limiting. Each data chunk has a local header. Namely, data_chunk$_0$ (210) includes header$_0$ (212), data_chunk$_1$ (230) includes header$_1$ (232), and data_chunk$_2$ (250) includes header$_2$ (252). The header in each respective data chunk retains information directed at key information, e.g. information directed at the persistent and transient elements that comprise the key pair of the data chunk. More specifically, each data chunk has a set of encrypted keys that form the key pair. Namely, data_chunk$_0$ (210) includes encrypted keys, key$_0$ (214) and key$_1$ (216), data_chunk$_1$ (230) includes encrypted keys, key$_2$ (234) and key$_3$ (236), and data_chunk$_2$ (250) includes encrypted keys, key$_4$ (254) and key$_5$ (256). For each transmitted data chunk, the encrypted key pair is also transmitted, with the transmission of the associate key pair being parallel or subsequent to receipt of the data stream and the respective data chunk(s).

It is understood that the persistent key is decrypted by the authentication manager (124), and in one embodiment with a local device key (116a), shown in this embodiment as being local to memory (116). As such, the authentication manager (124) validates the device authentication key at least parallel to receipt of the data stream and associated data chunks. Similarly, it is understood that the monitor (126) manages the situational characteristics of the device (110) and selectively enables decryption of the encrypted transient key subject to device situational data. In one embodiment, the observation of device situational data and characteristics takes place in real-time, which translates to real-time management of the encrypted transient key.

Figure 3:
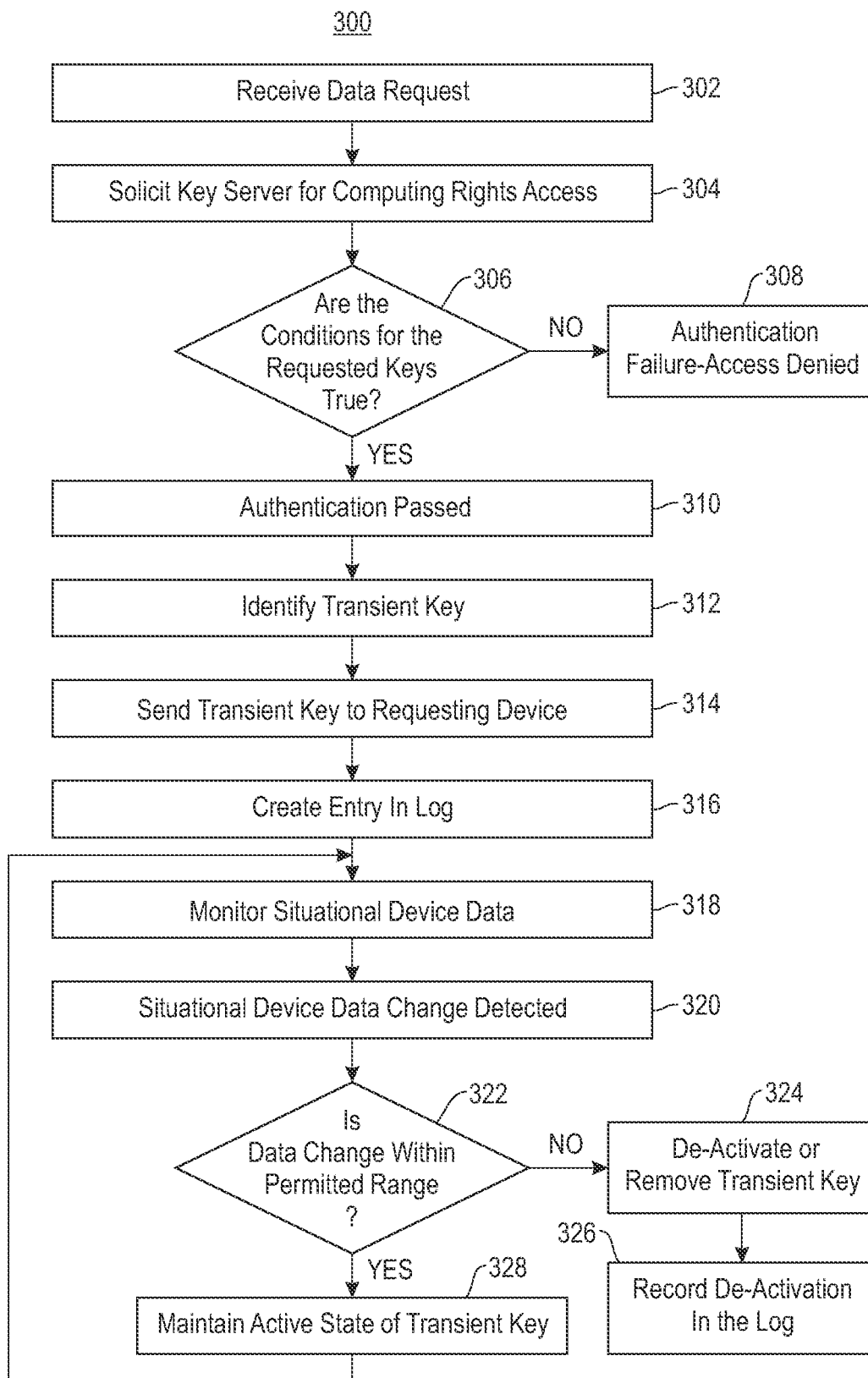
FIG. 3 depicts a flow chart illustrating a process validating encrypted situational data.

Referring to FIG. 3, a flow chart (300) is provided illustrating a process for validating encrypted situational data. As shown, a request for data is received (302). The requested data may be part of a data stream and separated into data chunks, as shown and described in FIG. 2, which each data chunk being separately encrypted with a persistent key and a transient key. A data request may be from a program or application local to or associated with a requesting device. In response to the data request at step (302), the key server is solicited (304). In one embodiment, the solicitation at step (304) provides data for computing access rights from the requesting device to the key server. For example, in one embodiment, the provided data includes the associated header. See FIG. 2 for details of the header and associated header data. Similarly, in one embodiment, the provided data includes identifying data, such as, but not limited to, a thumbprint, facial recognition data, answers to one or more questions, etc. The purpose of the data provided to the key server at step (304) is to identify the source of the data request to the key server and to authenticate the persistent encryption key. In one embodiment, the transmission of header data with the key information maintained therein enables and supports the transmission of the encrypted key pair parallel with receipt of the data stream, e.g. identified data chunks therein.

Either as part of the data provided at step (304) or in a separate step, data communicated to the key server includes persistent data directed at the persistent encryption key and transient data directed at the transient encryption key. Following step (304), it is determined if the conditions for the requested keys are true (306). In order to receive keys to decrypt the requested data both the persistent and transient authentication conditions need to be true, e.g. pass. In one embodiment, the persistent decryption key may be local to the requesting device, and the key server may be limited to authentication of the requesting device with respect to the associated transient data. In one embodiment, the authentication of the key pairs is sequential, such as registering the requesting device authentication key and validating the device authentication key after authentication of the transient key. A negative response to the determination at step (306) is an indication that the authentication failed, and the data access is denied (308). However, a positive response to the determination at step (306) is an indication that the authentication passed (310), at least initially, and the transient encryption key is identified (312) and communicated to the requesting device (314). For example, in one embodiment, the persistent key, e.g. device key, is authenticated parallel with receipt of the data steam at step (314), with the transient key authentication taking place at step (312) prior to the persistent key authentication. Accordingly, as demonstrated, both the persistent and transient key authentication is required to decrypt the requested and encrypted data.

By its very definition, the transient data is subject to change in real-time. As demonstrated herein, one or more transient or situational conditions of the requesting device are monitored in real-time for any change in the associated situational data. In one embodiment, the real-time monitoring is limited to an active state of the transient key decryption. At such time as the transient key is active and a change in the monitored situational data as it pertains to the transient key is detected, the transient key may be maintained, de-activated, removed, or in one embodiment, destroyed.

It is understood that maintaining a recording of the key authentications and transmissions is an important aspect of quality control. Either parallel to or sequential with the transmission of the transient key at step (314), an entry of the key transmission is created in an associated log (316). In one embodiment, the log entry identifies the encrypted data chunks, the time of transmission, the requesting device, and the identifiers of both the persistent key and the transient key. In addition to maintenance of the log, it is understood that the transient key by its very nature and characteristics has limited range of use. More specifically, the transient key may be valid for a limited period of time, valid with respect to a geographical boundary, etc. After transmission of the transient key at step (316), situational data of the requesting device is monitored (318). More specifically, the monitoring takes place in real-time. At such time as a change in the transient data, e.g. situational data is detected (320), an assessment is conducted with respect to the detected change and the terms of the transient key (322). More specifically, at step (322) it is determined if the detected change in the transient data of the requesting device is within the terms of the transient key. A negative response to the determination at step (322) is following by de-activating or removing the transient key (324), thereby preventing the device from accessing or utilizing the requested data. In addition, the de-activation or removal from step (324) is recorded in the log (326). Accordingly, the transient key is subject to de-activation in real-time based on the monitored situational characteristics of the requesting device.

As the situational data is dynamic and subject to change, not all changes will result in de-activation of the transient key. More specifically, a positive response to the determination at step (322) is followed by maintaining a state of the transient key as activate (328), thereby enabling the requesting device to continue use of the requested data. Following step (328) the process returns to step (318) for continued situational monitoring. Accordingly, the state of the requesting device is monitored and managed in real-time together with management of the transient key.

Figure 4:
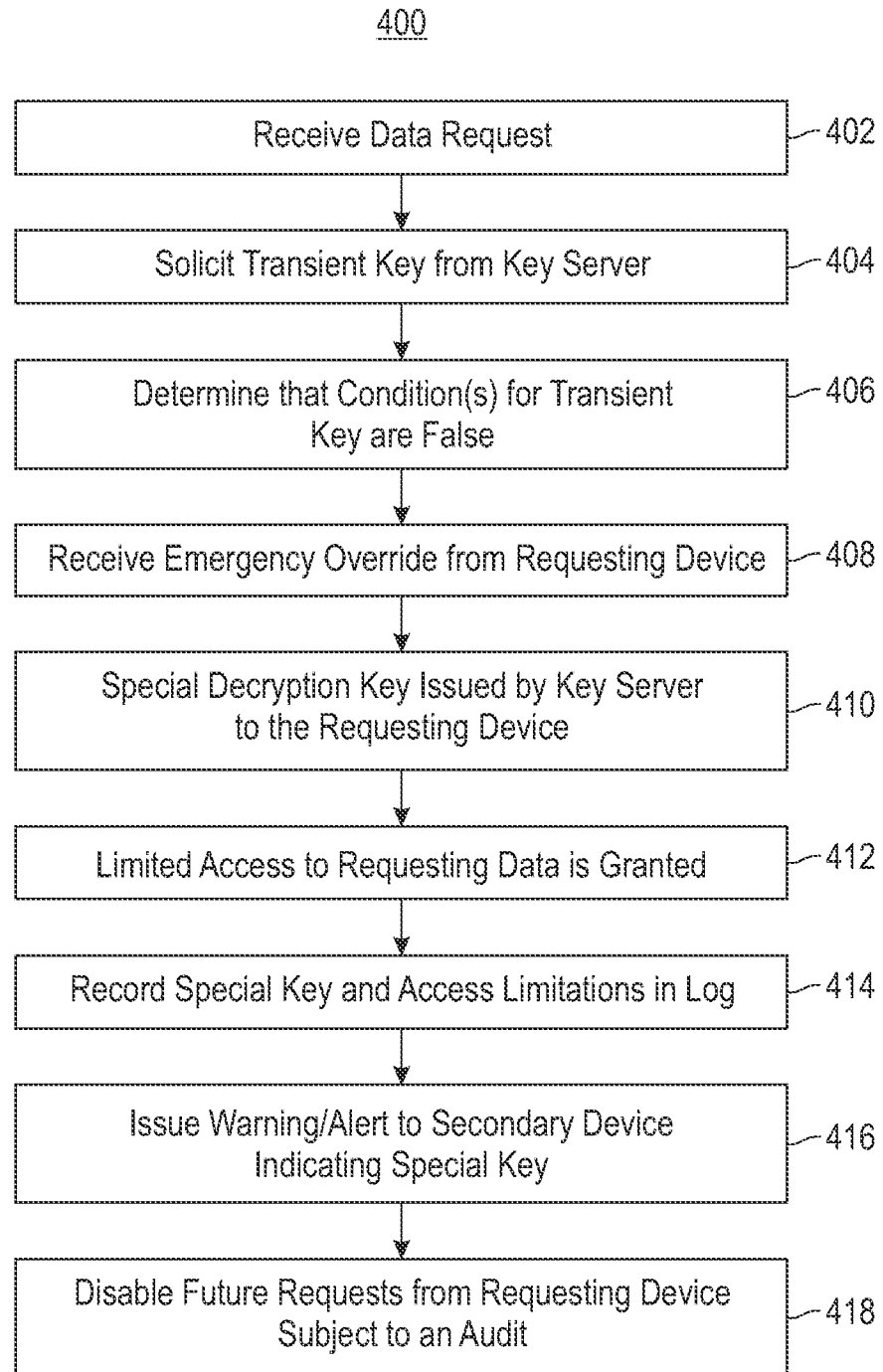
FIG. 4 depicts a flow chart illustrating implementation of granting limited access and use of the transient key.

It is understood that a back door approach to the re-encrypted sensitive data may be warranted in select circumstances. This is referred to as an emergency override policy. For example, a professional may require access to a record when the professional is off duty or not in their work location. Referring to FIG. 4, a flow chart (400) is provided illustrating implementation of granting limited access and use of the transient key and authentication of the transient key. A data request is received (402) and the key server is solicited (404). Following step (404), it is determined that the conditions for the requested keys are false (406), e.g. the conditions of the transient key do not match the situational data of the requesting device. An emergency override is received, as indicated by the requesting device requesting access to a selective portion or all of the re-encrypted data in a limited form (408). A special decryption key is issued by the key server to the requesting device (410), which is employed to authenticate the received data and responsive to the authentication to grant limited access to the requested data (412). In addition, the limited access is recorded in the access log (414), and in one embodiment, an alert or warning is issued and transmitted to a secondary device indicating the issuance of the special decryption key (416). In one embodiment, the issuance of the warning will disable any future data requests from the requesting device until the log and associated emergency request have been audited (418). Accordingly, a device that violates the terms of transient encryption key may be selectively granted a special decryption key for limited access to the requested data.

Figure 5:
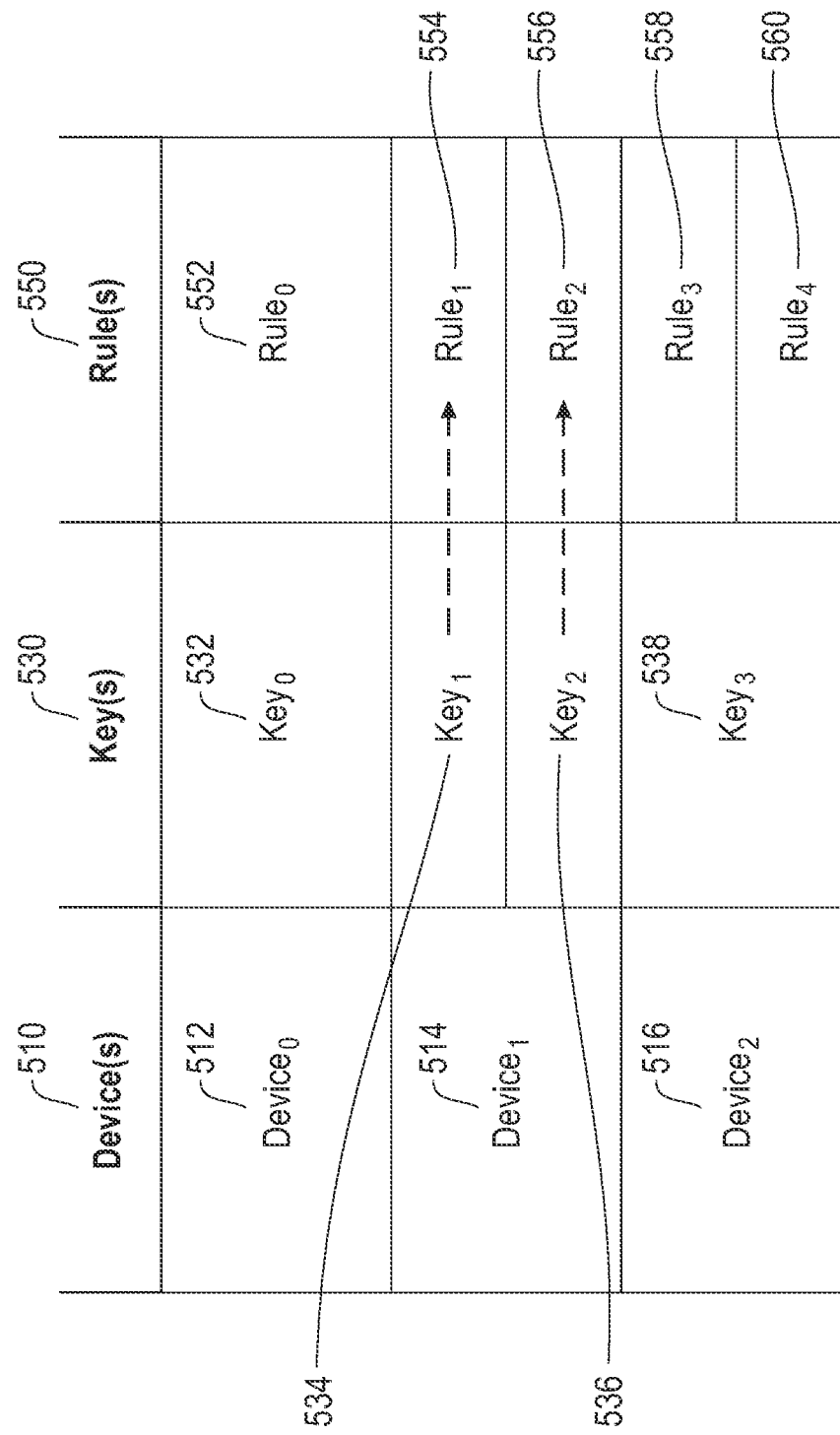
FIG. 5 depicts a block diagram illustrating an example data structure directed at transient encryption keys.

As shown and described in FIG. 4, there are circumstances that may yield issuance of the special encryption key to enable an override of the transient device monitoring. Referring to FIG. 5, a block diagram (500) is provided illustrating an example data structure directed at transient encryption keys. As shown, the data structure includes a selection of fields, including but not limited to, devices (510), keys (530), and associated rules (550). It is understood that the associated rules may dictate availability or validity of transient keys based on various factors, including but not limited to, geographical location, day of the week, time of day, and various other transient and situational characteristics that are subject to change in a dynamic manner. As shown, $device_0$ (512) is associated with $key_0$ (532) and $rule_0$ (552) as it related to selective criteria and characteristics indicating when the key, $key_0$ (532) should be active. It is understood that a device may have access to more than one key, such as different encryption keys for different situations. In the example shown herein, $device_1$ (514) is associated with $key_1$ (534) and $key_2$ (536), with $rule_1$ (554) being associated with $key_1$ (534) and $rule_2$ (556) being associated with $key_2$ (536). Similarly, in one embodiment, a single key may be associated with two or more rules. For example, $device_2$ (516) is associated with $key_3$ (538), with $rule_3$ (558) and $rule_4$ (560) being associated with $key_3$ (538). The association of devices to keys and rules may be subject to change. For example in one embodiment, the key manager (122) may modify the assignment and/or settings shown and described herein. Similarly, in one embodiment, the authentication manager (124) consults the data structure prior to issuance of the transient key to a requesting device. It is understood that the devices shown and described herein and classified in the device field (510) are addressable devices, each having a unique identifier to enable communication with the device and assignment of keys and associated rules. In one embodiment, the keys and rules are dynamic and subject to change or re-assignment to one or more devices, each addressable via their unique identifier. Accordingly, the structure shown and described herein functions as a tool to organize the association between a device, one or more keys, and one or more rules.

As shown and described herein, situational device data is monitored in real-time. Furthermore, as shown and described in FIG. 1, the monitor (126) manages the situational characteristics of the device. Access to the requested data requires authentication of both the persistent key and the transient key, with the transient key subject to real-time management directed at the physical characteristics of the physical device. Once both keys have been validated, the received data chunk(s) are decrypted.

As shown and described above, situational data is transient and subject to change in a dynamic manner. There are different forms of transient data. For example, in one embodiment, transient data may be based on the physical location of the requesting device. In another embodiment, transient data may be data subject to change based on classification of the associated device and device holder with respect to time of day. These are merely examples of transient data and should not be considered limiting. Accordingly, the transient key as it related to situational or physical data of the requesting device is subject to dynamic management.

Aspects of dynamic data encryption and decryption shown and described in FIGS. 1-4, employ one or more functional tools to support authentication, real-time monitoring, and auditing. Aspects of the functional tool(s), and its associated functionality may be embodied in a computer system/server in a single location, or in one embodiment, may be configured in a cloud based system sharing computing resources.

Figure 6:
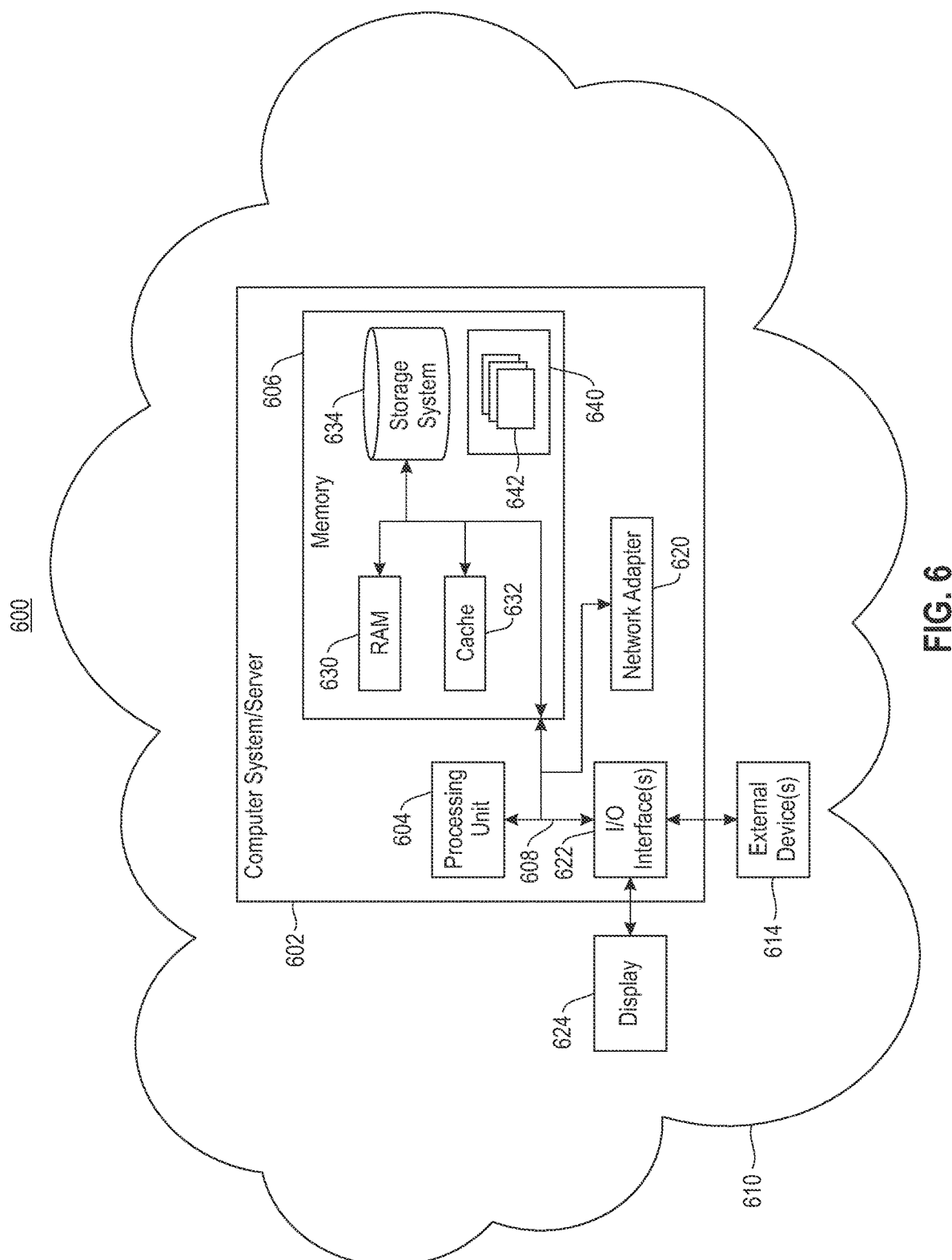
FIG. 6 is a block diagram illustrating an example of a computer system/server of a cloud based support system, to implement the process described above with respect to FIGS. 3-4.

With reference to FIG. 6, a block diagram (600) is provided illustrating an example of a computer system/server (602), hereinafter referred to as a host (602) in communication with a cloud based support system, to implement the processes described above with respect to FIGS. 1-4. Host (602) is operational with numerous other general purpose or special purpose computing system environments or configurations. Examples of well-known computing systems, environments, and/or configurations that may be suitable for use with host (602) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (602) may be described in the general context of computer system-executable instructions, such as program modules, being executed by a computer system. Generally, program modules may include routines, programs, objects, components, logic, data structures, and so on that perform particular tasks or implement particular abstract data types. Host (602) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, host (602) is shown in the form of a general-purpose computing device. The components of host (602) may include, but are not limited to, one or more processors or processing units (604), a system memory (606), and a bus (608) that couples various system components including system memory (606) to processor (604). Bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (602) and it includes both volatile and non-volatile media, removable and non-removable media.

Memory (606) can include computer system readable media in the form of volatile memory, such as random access memory (RAM) (630) and/or cache memory (632). By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces.

Program/utility (640), having a set (at least one) of program modules (642), may be stored in memory (606) by way of example, and not limitation, as well as an operating system, one or more application programs, other program modules, and program data. Each of the operating systems, one or more application programs, other program modules, and program data or some combination thereof, may include an implementation of a networking environment. Program modules (642) generally carry out the functions and/or methodologies of embodiments to data encryption and associated authentication and decryption processing and output directed at delivery execution. For example, the set of program modules (642) may include the modules configured as the key manager, authentication manager, monitor, and log manager as shown and described in FIG. 1.

Host (602) may also communicate with one or more external devices (614), such as a keyboard, a pointing device, a sensory input device, a sensory output device, etc.; a display (624); one or more devices that enable a user to interact with host (602); and/or any devices (e.g., network card, modem, etc.) that enable host (602) to communicate with one or more other computing devices. Such communication can occur via Input/Output (I/O) interface(s) (622). Still yet, host (602) can communicate with one or more networks such as a local area network (LAN), a general wide area network (WAN), and/or a public network (e.g., the Internet) via network adapter (620). As depicted, network adapter (620) communicates with the other components of host (602) via bus (608). In one embodiment, a plurality of nodes of a distributed file system (not shown) is in communication with the host (602) via the I/O interface (622) or via the network adapter (620). It should be understood that although not shown, other hardware and/or software components could be used in conjunction with host (602). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (606), including RAM (630), cache (632), and storage system (634), such as a removable storage drive and a hard disk installed in a hard disk drive.

Computer programs (also called computer control logic) are stored in memory (606). Computer programs may also be received via a communication interface, such as network adapter (620). Such computer programs, when run, enable the computer system to perform the features of the present embodiments as discussed herein. In particular, the computer programs, when run, enable the processing unit (604) to perform the features of the computer system. Accordingly, such computer programs represent controllers of the computer system.

In one embodiment, host (602) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
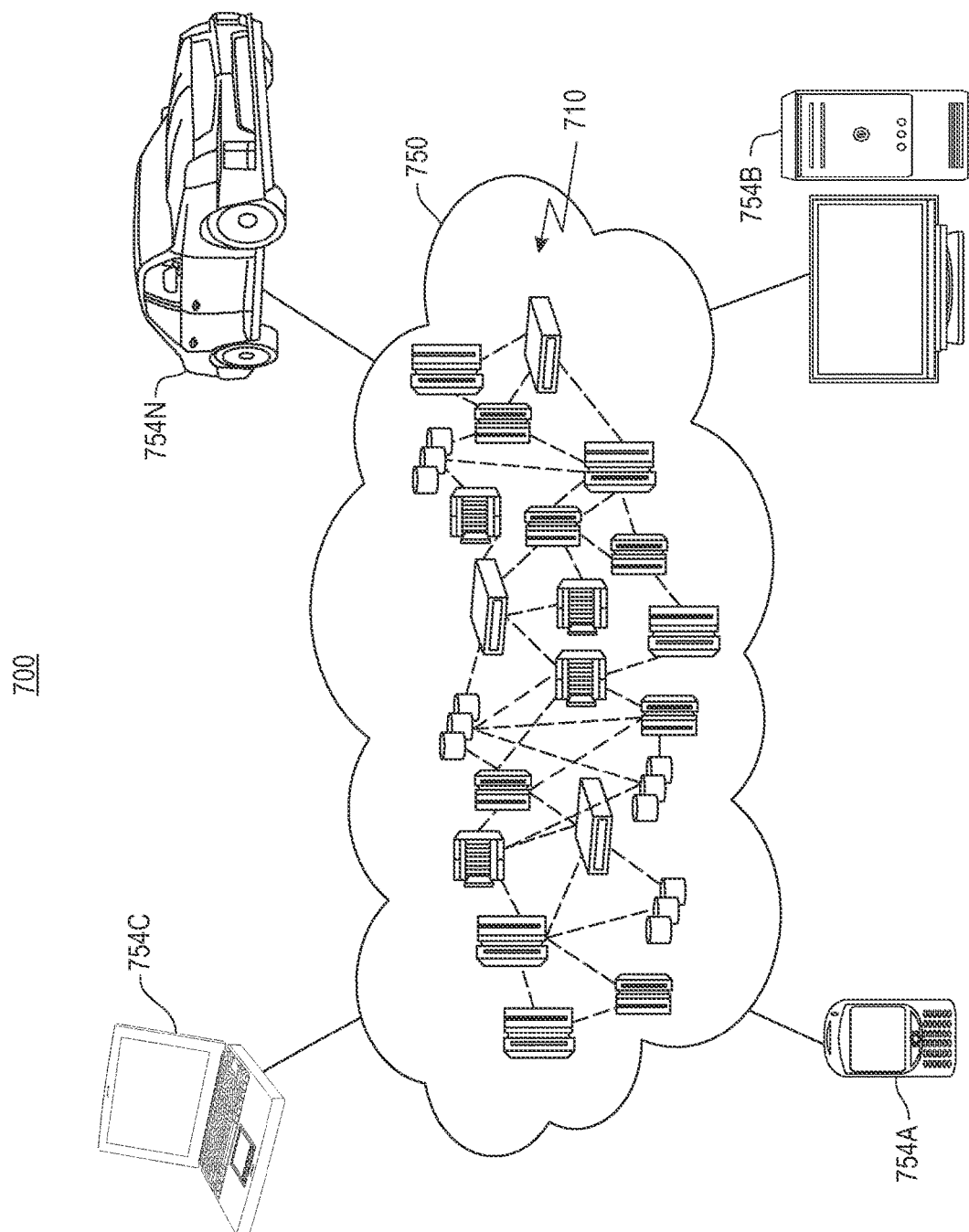
FIG. 7 depicts a block diagram illustrating a cloud computer environment.

Referring now to FIG. 7, an illustrative cloud computing network (700). As shown, cloud computing network (700) includes a cloud computing environment (750) having one or more cloud computing nodes (710) with which local computing devices used by cloud consumers may communicate. Examples of these local computing devices include, but are not limited to, personal digital assistant (PDA) or cellular telephone (754A), desktop computer (754B), laptop computer (754C), and/or automobile computer system (754N). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (700) to offer infrastructure, platforms and/or software as services for which a cloud consumer does not need to maintain resources on a local computing device. It is understood that the types of computing devices (755A-N) shown in FIG. 7 are intended to be illustrative only and that the cloud computing environment (750) can communicate with any type of computerized device over any type of network and/or network addressable connection (e.g., using a web browser).

Figure 8:
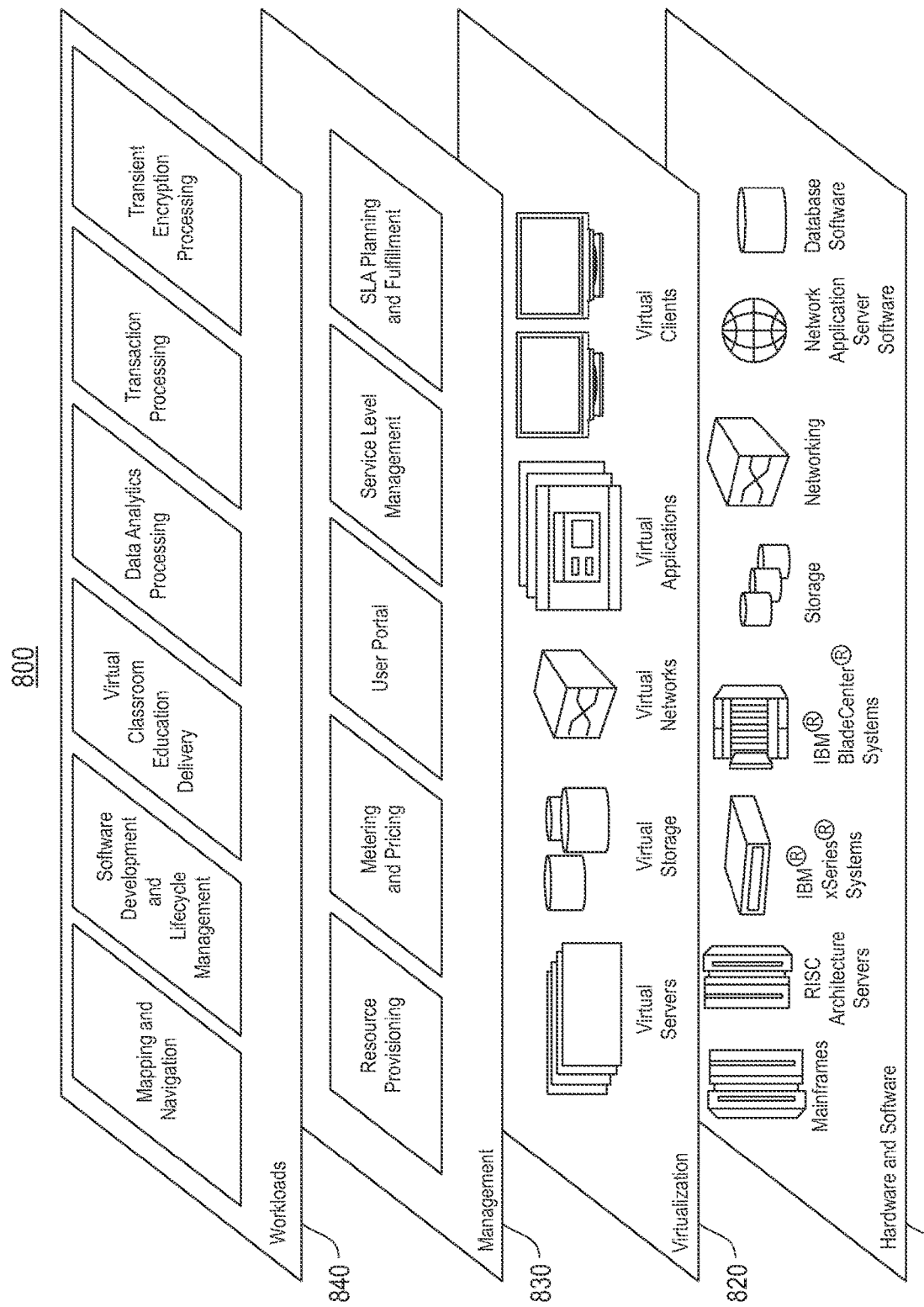
FIG. 8 depicts a block diagram illustrating a set of functional abstraction model layers provided by the cloud computing environment.

Referring now to FIG. 8, a set of functional abstraction layers (800) provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840). The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and transient encryption processing.

It will be appreciated that there is disclosed herein a system, method, apparatus, and computer program product for evaluating and processing data requests, and a bifurcated encryption policy for the requested data. A transient data encryption and decryption policy is invoked with real-time management and oversite to maintain the veracity of the transient characteristics and security of the underlying data. As disclosed, the system, method, apparatus, and computer program product apply real-time management and processing to the transient authentication of one or more data chunks in an associated data stream to contribute to enforcement of data encryption across a plurality of environments.

While particular embodiments of the present embodiments have been shown and described, it will be obvious to those skilled in the art that, based upon the teachings herein, changes and modifications may be made without departing from these embodiments and their broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product are operative to improve the functionality and operation of notification processing and delivery.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, the authentication of data together with the transient encryption thereof may be carried out by different computing platforms or across multiple devices. Furthermore, the data storage and/or authentication key management may be localized, remote, or spread across multiple systems. It is further understood that changing the state of the transient key or removing the transient key from the requesting device, transforms a physical state of the requesting physical computing device. For example, the device may be in an active physical state responsive to an authenticated and valid transient key, and the device may be in an inactivate state responsive to invalidation or removal of the transient key. Accordingly, the scope of protection of these embodiments is limited only by the following claims and their equivalents.

What is claimed is:

1. A system comprising:
   a physical device configured to request access to data encrypted with a physical device authentication key and a transient key; and
   one or more tools configured to process the requested data, including:
   authentication software configured to subject the physical device authentication key to device authentication and to subject the transient key to situational authentication, wherein the device authentication is different from the situational authentication;
   the authentication software configured to validate the physical device authentication key and the transient key;
   a monitor, operatively coupled to the authentication software, configured to manage the physical device situational data, including to selectively enable access to the requested data responsive to the validation of the physical device authentication key and the transient key; and the authentication software configured to de-activate the transient key responsive to a change in the physical device situational data.

2. The system of claim 1, further comprising the physical device to receive a false key condition responsive to a failure of the authentication software to validate at least the transient key.

3. The system of claim 2, further comprising a key manager configured to issue a special decryption key to the physical device, wherein the special decryption key is configured to enable limited access to the requested data.

4. The system of claim 3, wherein responsive to utilization of the special decryption key, an alert is issued and transmitted to a secondary device.

5. The system of claim 4, wherein responsive to the issuance of the alert, access to additional data is disabled for the physical device until the issued alert has been reviewed by the secondary device.

6. The system of claim 1, wherein the de-activation of the transient key to remove access to the requested data includes invalidation of the transient key or removal of the transient key from the physical device.

7. The system of claim 1, further comprising the authentication software configured to:
register the device authentication key; and
validate the device authentication key parallel to receipt of the requested data.

8. A computer program product to facilitate situation authentication of data, comprising:
a tangible computer readable storage device having program code embodied therewith, the program code executable by a processing unit to:
request by a physical device access to data encrypted with a physical device authentication key and a transient key;
subject the physical device authentication key to device authentication and subject the transient key to situational authentication, wherein the device authentication is different from the situational authentication;
validate the physical device authentication key;
validate the transient key subject to physical device situational data, wherein the transient key being subject to the physical device situational data such that a change in the physical device situational data selectively affects validity of the transient key;
selectively enable access to the requested data responsive to the validation of the physical device authentication key and the transient key; and
de-activate the transient key from the physical device responsive to the change in the physical device situational data.

9. The computer program product of claim 8, further comprising program code configured to receive by the physical device a false key condition responsive to a failure of the validation of at least the transient key.

10. The computer program product of claim 9, further comprising program code configured to issue a special decryption key to the physical device, wherein the special decryption key is configured to enable limited access to the requested data.

11. The computer program product of claim 10, wherein responsive to utilization of the special decryption key, an alert is issued and transmitted to a secondary device.

12. The computer program product of claim 11, wherein responsive to the issuance of the alert, access to additional data is disabled for the physical device until the issued alert has been reviewed by the secondary device.

13. The computer program product of claim 8, wherein the de-activation of the transient key to remove access to the requested data includes program code to invalidate the transient key or removal of the transient key from the physical device.

14. A method comprising:
receiving a request from a physical device to access data encrypted with a physical device authentication key and a transient key;
subjecting the physical device authentication key to device authentication and subjecting the transient key to situational authentication, wherein the device authentication is different from the situational authentication;
validating the physical device authentication key;
validating the transient key subject to physical device situational data, wherein the transient key being subject to the physical device situational data such that a change in the physical device situational data selectively affects validity of the transient key;
monitoring the physical device situational data, including selectively enabling access to the requested data responsive to the validation of the physical device authentication key and the transient key; and
de-activating the transient key responsive to the change in the monitored physical device situational data.

15. The method of claim 14, further comprising receiving by the physical device a false key condition responsive to a failure of the validation of at least the transient key.

16. The method of claim 15, further comprising issuing a special decryption key to the physical device, wherein the special decryption key is configured to enable limited access to the requested data.

17. The method of claim 16, wherein responsive to utilization of the special decryption key, an alert is issued and transmitted to a secondary device.

18. The method of claim 17, wherein responsive to the issuance of the alert, access to additional data is disabled for the physical device until the issued alert has been reviewed by the secondary device.

19. The method of claim 14, wherein de-activating the transient key to remove access to the requested data includes invalidating the transient key or removing the transient key from the physical device.

20. The method of claim 14, further comprising:
registering the device authentication key; and
validating the device authentication key parallel to receiving the requested data.

* * * * *